(12) United States Patent
Xiao et al.

(10) Patent No.: US 12,001,122 B2
(45) Date of Patent: Jun. 4, 2024

(54) SPECIAL EFFECT SCREEN AND PHOTO BOOTH

(71) Applicant: MARVEL TECHNOLOGY (CHINA) CO., LTD, Shenzhen (CN)

(72) Inventors: Heping Xiao, Shenzhen (CN); Jia Li, Shenzhen (CN)

(73) Assignee: MARVEL TECHNOLOGY (CHINA) CO., LTD, Shenzhen (CN)

( * ) Notice: Subject to any disclaimer, the term of this patent is extended or adjusted under 35 U.S.C. 154(b) by 0 days.

(21) Appl. No.: 18/350,192

(22) Filed: Jul. 11, 2023

(65) Prior Publication Data

US 2024/0019766 A1 Jan. 18, 2024

(30) Foreign Application Priority Data

Jul. 12, 2022 (CN) .......................... 202221795402.1

(51) Int. Cl.
*G03B 15/10* (2021.01)

(52) U.S. Cl.
CPC .................... *G03B 15/10* (2013.01)

(58) Field of Classification Search
CPC ..... G03B 15/06; G03B 17/53; G09F 15/0031; G09F 15/0062
See application file for complete search history.

(56) References Cited

U.S. PATENT DOCUMENTS

| | | | | |
|---|---|---|---|---|
| 2,140,602 | A * | 12/1938 | Simjian | G03B 19/023 396/338 |
| 4,236,795 | A * | 12/1980 | Kephart | G03B 15/06 396/428 |
| 7,963,059 | B2 * | 6/2011 | Fritsche | G09F 15/0068 40/607.04 |
| 9,618,830 | B1 * | 4/2017 | Nicholas | G03B 15/06 |
| 9,641,730 | B2 * | 5/2017 | Rosenberry | F16M 13/00 |
| 10,171,734 | B2 * | 1/2019 | Mueller | H04N 23/698 |
| 2021/0266427 | A1 * | 8/2021 | Kidakarn | H04N 23/57 |

FOREIGN PATENT DOCUMENTS

| | | | | |
|---|---|---|---|---|
| CN | 214041971 | U | * 8/2021 | |
| CN | 216243272 | U | * 4/2022 | G03B 15/00 |
| CN | 217467517 | U | * 9/2022 | |
| JP | 2008209615 | A | * 9/2008 | |

* cited by examiner

*Primary Examiner* — Leon W Rhodes, Jr.
(74) *Attorney, Agent, or Firm* — Daniel M. Cohn; Howard M. Cohn (57) ABSTRACT

A special effect screen and a photo booth include a special effect screen assembly. The special effect screen assembly includes a supporting frame and a special effect curtain. The supporting frame supports and unfolds the special effect curtain, so that a top projection of the special effect curtain is curved. The supporting frame includes an adjusting mechanism adjusting an arc of the top projection of the special effect curtain. The supporting frame includes a connecting base, two adjusting frames, first fasteners, and elastic supporting rods. The two adjusting frames are respectively arranged on two sides of the connecting base and are slidably connected to the connecting base. The first fasteners are configured to connect the adjusting frames to the connecting base. The elastic supporting rods pass through the special effect curtain. Two ends of each of the elastic supporting rods are respectively connected to the two adjusting frames.

18 Claims, 10 Drawing Sheets

FIG. 1

Prior art

FIG. 2

Prior art

FIG. 11

SPECIAL EFFECT SCREEN AND PHOTO BOOTH

TECHNICAL FIELD

The present disclosure relates to a technical field of photography and camera equipment, and in particular to a special effect screen that is curved after unfolding and a photo booth.

BACKGROUND

Nowadays, with development of science and technology, photography and videography are more and more popular. Taking images is no longer a luxury, and selfies are even more readily available. A shooting platform, such as a 360-degree shooting platform (also known as a 360 photo booth), is a platform that is rotatable and allows a user standing thereon to shoot 360 degrees. Compared with conventional selfie equipment, the photo booth brings a rich entertainment experience.

Figure 1:
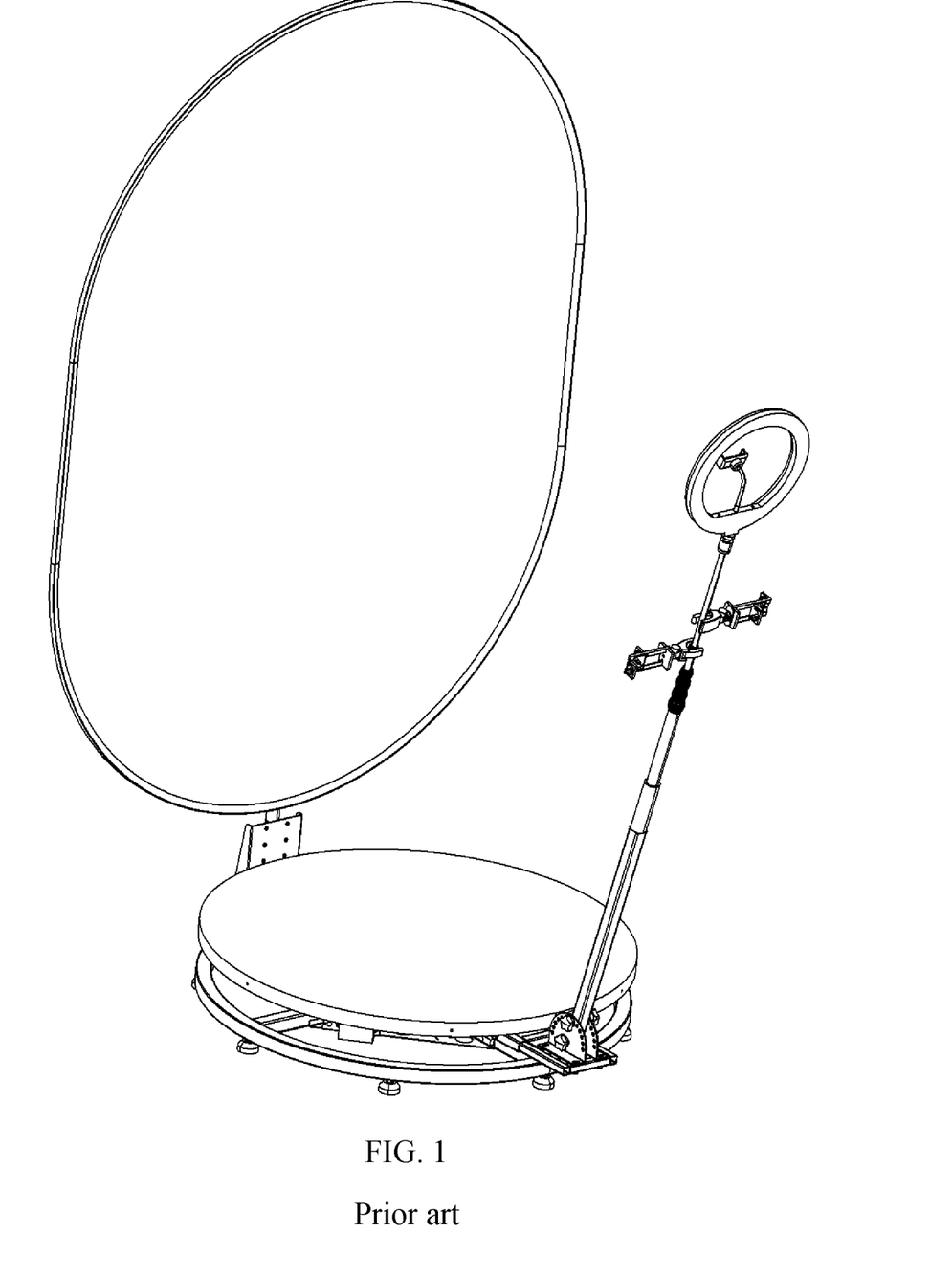
FIG. 1 is a structural schematic diagram of a photo booth and a special effect screen in the prior art.
Figure 2:
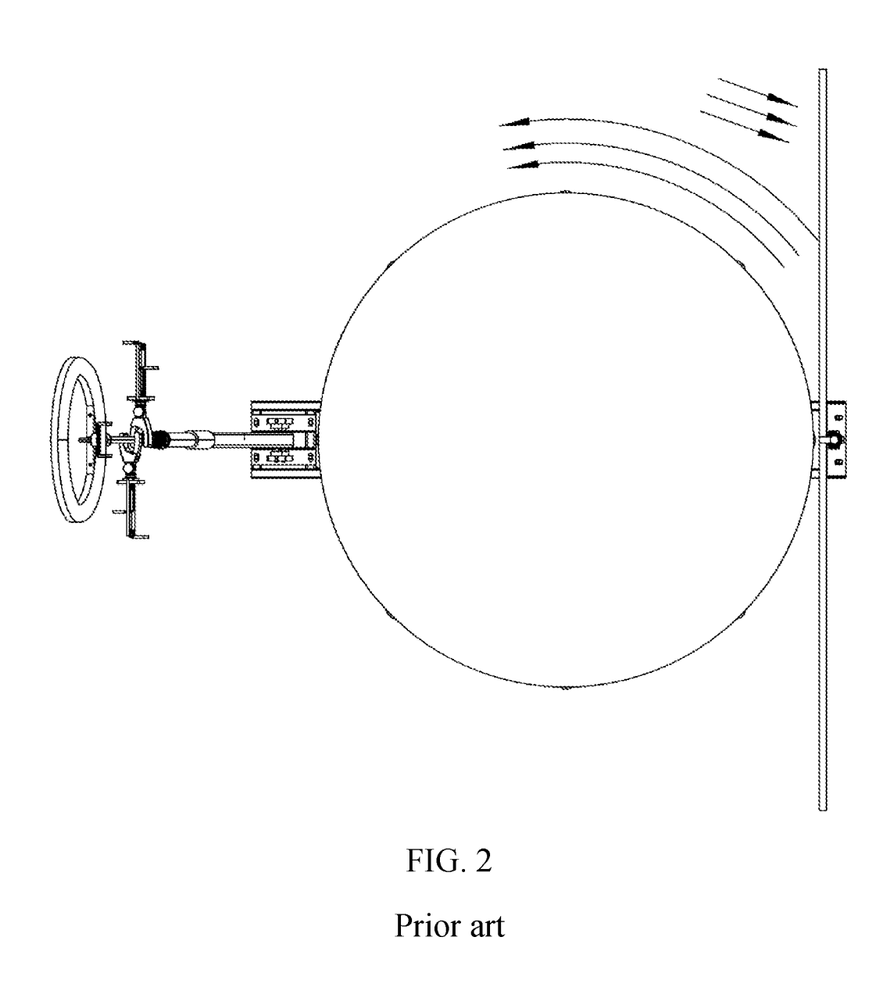
FIG. 2 is a top plan diagram of the photo booth and the special effect screen in the prior art.
Figure 3:
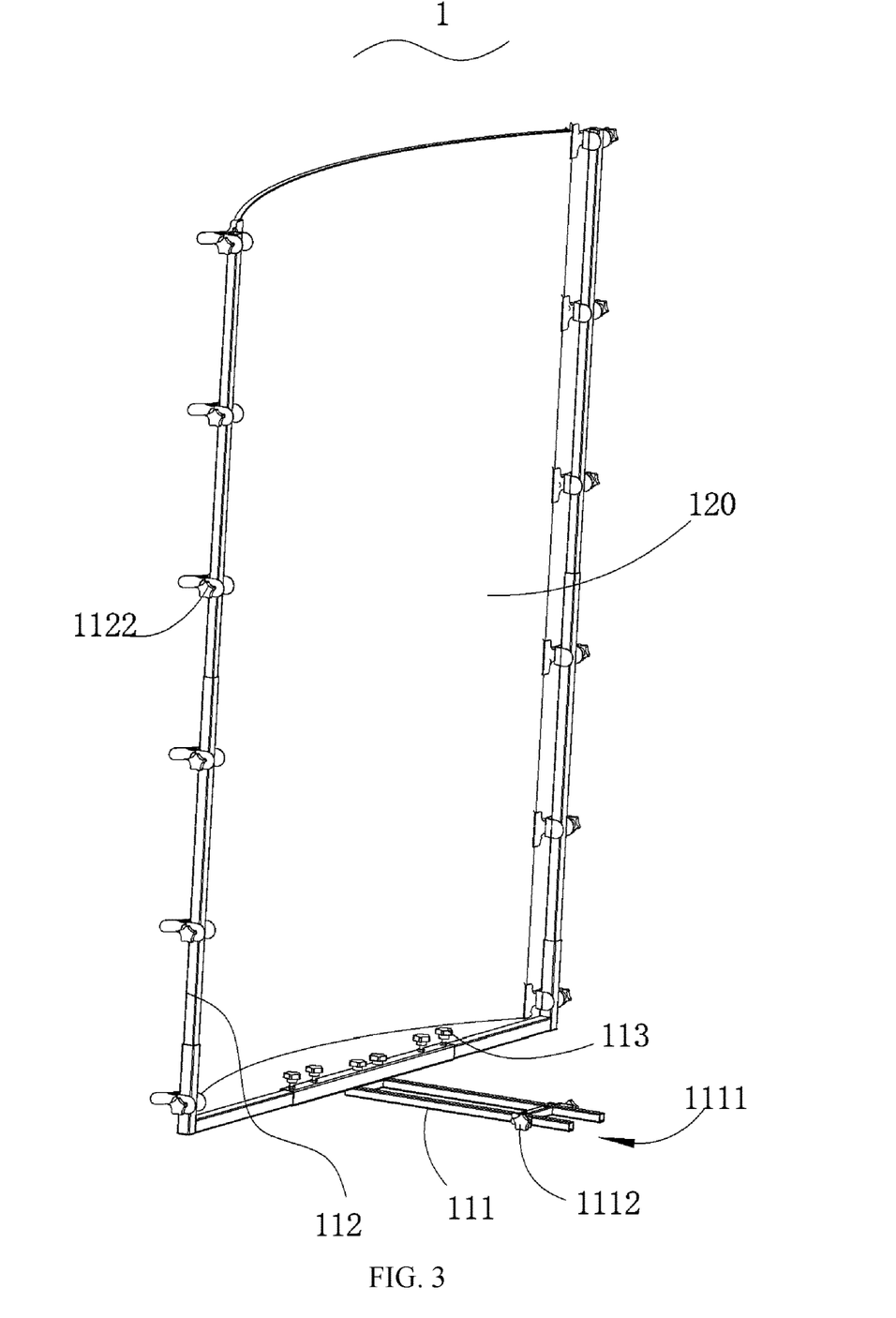
FIG. 3 is a structural schematic diagram of a special effect screen that is curved after unfolding of the present disclosure.

As shown in FIGS. 1 and 2, a special effect screen is arranged on a conventional photo booth. A camera captures images of the user standing on the photo booth and the special effects screen. The special effect screen blocks the environment behind the special effect screen that does not need to enter the images. Then collected image data is transmitted to a corresponding processing module for processing. When processing, the special effect screen shown in the images is cutout and replaced with other background and/or special effects. However, the special effect screen is a straight flat screen. When the special effect screen is driven to rotate around the photo booth by a driving device of the photo booth, a surface of the special effect screen faces air in a direction opposite to a rotation direction is flat. As a result, the special effect screen is subjected to a reaction force of the air, leading to shaking of the special effect curtain and affecting a user experience.

SUMMARY

In view of defects mentioned above, an object of the present disclosure is to provide a special effect screen that is curved after unfolding and a photo booth to solve technical problem in the prior art.

To achieve the above object, the present disclosure provides the special effect screen that is curved after unfolding. The special effect screen comprises a special effect screen assembly. The special effect screen assembly comprises a supporting frame and a special effect curtain. The supporting frame is configured to support and unfold the special effect curtain, so that a top projection of the special effect curtain is curved.

Furthermore, the supporting frame comprises an adjusting mechanism configured to adjust an arc of the top projection of the special effect curtain.

Furthermore, the supporting frame comprises a connecting base, two adjusting frames, first fasteners, and elastic supporting rods. The two adjusting frames are respectively arranged on two sides of the connecting base and are slidably connected to the connecting base. The first fasteners are configured to connect the adjusting frames to the connecting base. The elastic supporting rods pass through the special effect curtain. Two ends of each of the elastic supporting rods are respectively connected to the two adjusting frames.

Furthermore, the adjusting frames comprise telescopic rods and second fasteners. The telescopic rods are extendable and retractable in a vertical direction. The elastic supporting rods are connected to the telescopic rods through the second fasteners.

Furthermore, each of the second fasteners comprises a hinge portion and a locking portion. An end portion of each of the elastic supporting rods is connected to a corresponding hinge portion of a corresponding second fastener. The end portion of each of the elastic supporting rods is rotatably connected to a corresponding adjusting frame of the adjusting frames by the corresponding hinge portion. Each locking portion is configured to fasten a corresponding second fastener to a corresponding telescopic rod.

Furthermore, the special effect curtain is a solid color curtain.

Furthermore, the special effect curtain is a green curtain or a blue curtain.

The present disclosure further provides a photo booth. The photo booth comprises the special effect screen mentioned above, a supporting stage, a shooting support, a driving assembly, and a supporting piece.

The shooting support is rotatably connected to the supporting piece. The supporting frame comprises a connecting end. The supporting frame is connected to the shooting support or rotatably connected to the supporting piece through the connecting end. The driving assembly is configured to dive the shooting support and the special effect curtain assembly to rotate around the supporting stage in a circumferential direction.

Furthermore, the photo booth further comprises third fasteners. The connecting end of the supporting frame is detachably connected to the shooting support. The shooting support comprises a connecting cavity configured to accommodate the connecting end of the supporting frame. The connecting end of the supporting frame extends into the connecting cavity. The third fasteners are configured to fasten the supporting frame to the shooting support.

Furthermore, the photo booth further comprises a supporting base. The supporting piece is a shaft body. A first end of the supporting piece is screwed with the supporting stage. A second end of the supporting piece defines a connecting groove. The connecting groove is welded to the supporting base. A locking screw passes through the supporting piece and the supporting stage to connect the supporting piece to the supporting stage. The driving assembly comprises a driving motor mounted on the supporting base, a driving wheel mounted on a power output end of the driving motor, a bearing sleeved on an outer wall of the supporting piece, and a driven wheel sleeved on an outer wall of the bearing. The shooting support and/or the supporting frame is connected to an end surface of the driven wheel.

Furthermore, the shooting support comprises a first bracket and a second bracket. The first bracket and the second bracket are movably connected to each other. The first bracket is configured to connect and mount a shooting device. The second bracket of the shooting support is movably connected to the supporting piece. The special effect curtain is arranged opposite to the first bracket.

The supporting stage comprises a supporting cover plate and a reinforcing frame. The supporting cover plate is detachably covered on the reinforcing frame. A shock-absorbing buffering piece is arranged between the supporting cover plate and the reinforcing frame.

Compared with the prior art, the present disclosure provides the special effect screen that is curved after unfolding and the photo booth. On one hand, the supporting frame supports and unfolds the special effect curtain, and on the other hand, the supporting frame is configured to connect to the photo booth. The supporting frame is driven by the driving assembly of the photo booth, and is driven to rotate around the supporting stage. Through the adjusting mechanism, the arc of the special effect curtain is adjusted, solving a problem in the prior art that a flat surface, facing air in a direction opposite to a rotation direction, of a conventional special effect screen, is subjected to a reaction force of the air. When the special effect curtain of the present disclosure contacts the air in the direction opposite to the rotation direction, an edge of the special effect curtain with a small area faces the air. Since the edge of the special effect screen is strip-shaped, the special effect curtain impacts the air tangentially in a form of a line, thereby avoiding subjecting to the reaction force of the air. Therefore, the special effect curtain does not shake, which makes a rotation of the special effect curtain stable.

In the drawings: 1-special effect curtain assembly; 110-supporting frame; 111-connecting base; 1111-connecting end; 1112-third fastener; 11121-connecting plate; 11122-connecting nut; 1113-movable cavity; 112-adjusting frame; 1121-telescopic rod; 1122-second fastener; 11221-hinge portion; 11222-locking portion; 1123-connecting rod; 113-first fastener; 114-elastic supporting rod; 120-special effect curtain; 121-connecting hole; 2-supporting stage; 210-supporting cover plate; 220-reinforcing frame 230-shock-absorbing buffering piece; 3-shooting support; 310-first bracket; 320-second bracket; 330-sefie ring light; 4-driving assembly; 410-driving motor; 420-driving wheel; 430-bearing; 440-driven wheel; 441-screw hole; 5-supporting piece; 6-supporting base; 7-foot cup.

DETAILED DESCRIPTION

As shown in FIGS. 3-7, in one embodiment, the present disclosure provides a special effect screen that is curved after unfolding. The special effect screen comprises a special effect screen assembly 1. The special effect screen assembly 1 comprises a supporting frame 110 and a special effect curtain 120. The supporting frame 110 is configured to support and unfold the special effect curtain 120, so that a top projection of the special effect curtain 120 is curved.

The supporting frame configured to adjust an arc of the special effect curtain of present disclosure is applied to a photo booth. On one hand, the supporting frame 110 supports and unfolds the special effect curtain 120. On the other hand, the supporting frame 110 is configured to connect to the photo booth. The supporting frame 110 is driven by a driving assembly of the photo booth, and is driven to rotate around a supporting stage.

The top projection of the special effect curtain 120 is curved, solving a problem in the prior art that a flat surface, facing air in a direction opposite to a rotation direction, of a conventional special effect screen, is subjected to a reaction force of the air. After adjusting the arc of the special effect curtain, when the special effect curtain contacts the air in the direction opposite to the rotation direction, an edge of the special effect curtain 120 with a small area faces the air. Since the edge of the special effect screen is strip-shaped, the special effect curtain 120 impacts the air tangentially in a form of a line, thereby avoiding subjecting to the reaction force of the air. Therefore, the special effect curtain 120 does not shake, which makes a rotation of the special effect curtain 120 stable.

The supporting frame comprises an adjusting mechanism 110 configured to adjust the arc of the top projection of the special effect curtain 120.

Through the adjusting mechanism 110, the arc of the special effect curtain 120 is adjusted, which makes the rotation of the special effect curtain 120 stable.

As shown in FIGS. 3-7, the supporting frame 110 comprises a connecting base 111, two adjusting frames 112, first fasteners 113, and elastic supporting rods 114. The two adjusting frames 112 are respectively arranged on two sides of the connecting base 111 and are slidably connected to the connecting base 111. The first fasteners 113 are configured to connect the adjusting frames 112 to the connecting base 111. The elastic supporting rods 114 pass through the special effect curtain. Two ends of each of the elastic supporting rods are respectively connected to the two adjusting frames 112.

The adjusting mechanism 110 is composed of the connecting base 111, two adjusting frames 112, first fasteners 113, and elastic supporting rods 114 of the supporting frame 110. The two adjusting frames 112 slide with respect to the connecting base 111. When the two adjusting frames 112 slide towards the connecting base 111 and slide close to each other, since the two ends of each of the elastic supporting rods 114 are respectively connected to the two adjusting frames 112, the elastic supporting rods 114 are bent along with sliding of the two adjusting frames 112. Since the elastic supporting rods 114 pass through the special effect curtain 120, the special effect curtain 120 deforms along with the elastic supporting rods 114. When an arc of the elastic supporting rods 114 coincides with the arc generated by rotation and movement of the special effect curtain 120, an interaction force between the special effect curtain 120 and the air in the direction opposite to the rotation direction is the smallest, making the special effect curtain 120 stable and preventing the special effect curtain 120 from shaking. When a distance between the two adjusting frames 112 is determined, the adjusting frames 112 are fixed to the connecting base 111 through the first fasteners 113. In some embodiments, the first fasteners 113 are thumb screws, and the connecting base 111 comprises movable cavities 1113 corresponding to the adjusting frames 112 and nuts corresponding to the adjusting frames 112.

By such adjustment, not only the arc of the top projection of the special effect curtain 120 is adjusted, but also an area of a front projection of the special effect curtain 120 is adjusted. That is, the unfolding area of the special effect curtain 120 is adjusted.

In some embodiments, connecting holes 121 are defined on a rear side of the special effect curtain 120. The elastic support rods 114 respectively pass through the connecting holes 121 and thus connecting to the special effect curtain 120 as a whole.

As shown in FIGS. 3-7, the adjusting frames 112 comprise telescopic rods 1121 and second fasteners 1122. The telescopic rods 1121 are extendable and retractable in a vertical direction. The elastic supporting rods 114 are connected to the telescopic rods 1121 through the second fasteners 1122.

In some embodiments, each of the telescopic rods 1121 may be a common structure similar to a retractable umbrella handle of an umbrella, which has a plurality of telescopic sections. Each of the telescopic sections is a hollow tubular structure, and one of the plurality of telescopic sections with a small diameter is sleeved in another one of the plurality of telescopic sections with a large diameter. Through vertical movements between the plurality of telescopic sections, the telescopic rods 1121 are extendable and retractable, so that the elastic supporting rods 114 connected to the telescopic rods 1121 through the second fasteners 1122 and special effect curtain 120 move along with the telescopic rods 1121. Therefore, a vertical unfolding area of the special effect curtain 120 is adjusted.

As shown in FIGS. 3-7, each of the second fasteners 1122 comprises a hinge portion 11221 and a locking portion 11222. An end portion of each of the elastic supporting rods 114 is connected to a corresponding hinge portion 11221 of a corresponding second fastener 1122. The end portion of each of the elastic supporting rods 114 is rotatably connected to a corresponding adjusting frame of the adjusting frames by the corresponding hinge portion. Each locking portion 11222 is configured to fasten a corresponding second fastener 1122 to a corresponding telescopic rod 1121.

In some embodiments, a structure of each hinge portion 11221 is generally a clip structure without a torsion spring. Each hinge portion 11221 comprises a first clip body and a second clip body. The first clip body is connected to the end portion of a corresponding elastic supporting rod 114, and the second clip body is connected to a corresponding telescopic rod 1121 of the adjusting frames 112 through a corresponding locking portion 11222. Each locking portion 11222 is a thumb screw. Each locking portion 11222 is not only configured to fasten the corresponding second fastener 1122 to the corresponding telescopic rod 1121, but also configured to separate the corresponding second fastener 1122 from the corresponding telescopic rod 1121, so that each of the second fasteners 1122 is movable with respect to the corresponding telescopic rod. After adjusting an position of each of the second fasteners 1122 and the corresponding elastic support rod 114, each locking portion 11222 fastens the corresponding second fastener 1122 to the corresponding telescopic rod 1121.

Each of the adjusting frames 112 comprises a connecting rod 1123 substantially vertically connected to a corresponding telescopic rod 1121, so that each of the adjusting frames 112 is L-shaped. The connecting base 111 defines the movable cavities 1113. The connecting rod 1123 of each of the adjusting frames 112 extends into a corresponding movable cavity 1113 of the movable cavities, so the adjusting frames 112 are slidably connected to the connecting base 111. Then each of the first fasteners 113 (i.e., the thumb screws) passing through a corresponding adjusting frame 112 and the connecting base 111 are screwed to fix the corresponding adjusting frame 112 and the connecting base 111.

Optionally, the special effect curtain 120 is a solid color curtain.

The special effect curtain 120 is selected as the solid color curtain, so that an image processing module can cut out and replace a background of an area of each collect image corresponding to the special effect curtain 120.

Optionally, the special effect curtain 120 is a green curtain or a blue curtain.

As shown in FIGS. 3-11, the present disclosure further provides a photo booth. The photo booth comprises the special effect screen mentioned above, a supporting stage 2, a shooting support 3, a driving assembly 4, and a supporting piece 5.

The shooting support 3 is rotatably connected to the supporting piece 5. The supporting frame 110 comprises a connecting end 1111. The supporting frame 110 is connected to the shooting support 3 or rotatably connected to the supporting piece 5 through the connecting end 1111. The driving assembly 4 is configured to dive the shooting support 3 and the special effect curtain assembly 1 to rotate around the supporting stage 2 in a circumferential direction.

The supporting stage 2 is configured for a user to stand, and the shooting support 3 is configured to connect and mount a shooting device. The special effect curtain 120 of the special effect curtain assembly 1 is arranged opposite to the shooting support 3. The driving assembly 4 dives the shooting support 3 and the special effect curtain assembly 1 to rotate around the supporting stage 2 in the circumferential direction. The shooting device mounted on the shooting support 3 collects images of the user standing on the supporting stage and the special effect curtain 120. The image processing module cuts out and replaces the background of the area of each collect image corresponding to the special effect curtain 120.

The special effect curtain assembly play enhances a balance of the shooting support 3 in a rotation process, thus ensuring stability of the shooting device during a rotation process. The special effect curtain 120 facilitates post-production image processing. When collecting and processing the images of the user, the special effect curtain 120 is configured as the background, which is convenient for adding special effects in a later stage, and enriches a function of the photo booth. Moreover, the arc of the special effect curtain 120 is adjusted by the adjusting mechanism, which further increases stability of the photo booth.

In some embodiments, the connecting end 1111 is arranged on the connecting base 111, and the connecting base 111 is a frame structure.

Figure 4:
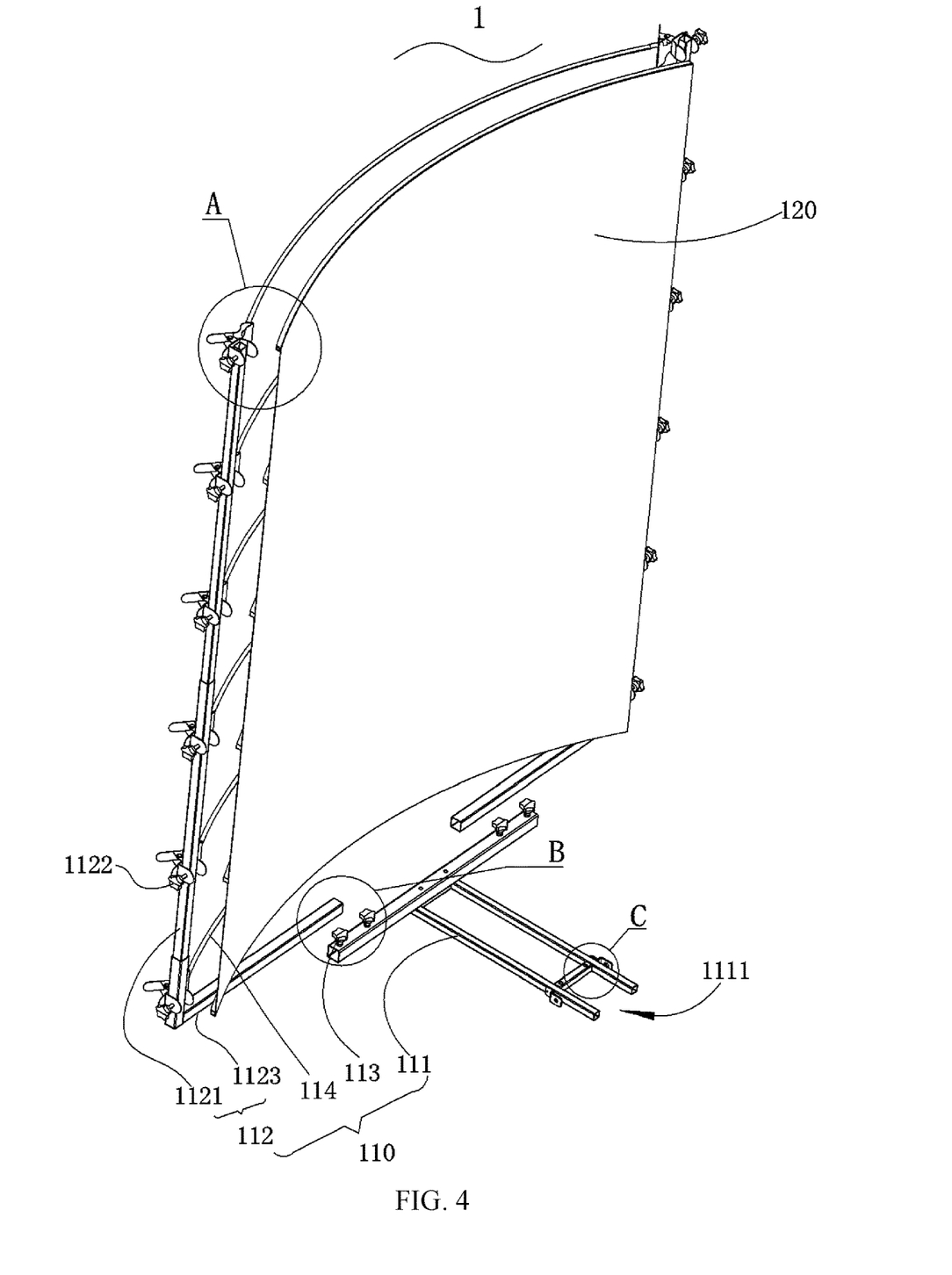
FIG. 4 is an exploded structural schematic diagram of the special effect screen that is curved after unfolding of the present disclosure.
Figure 5:
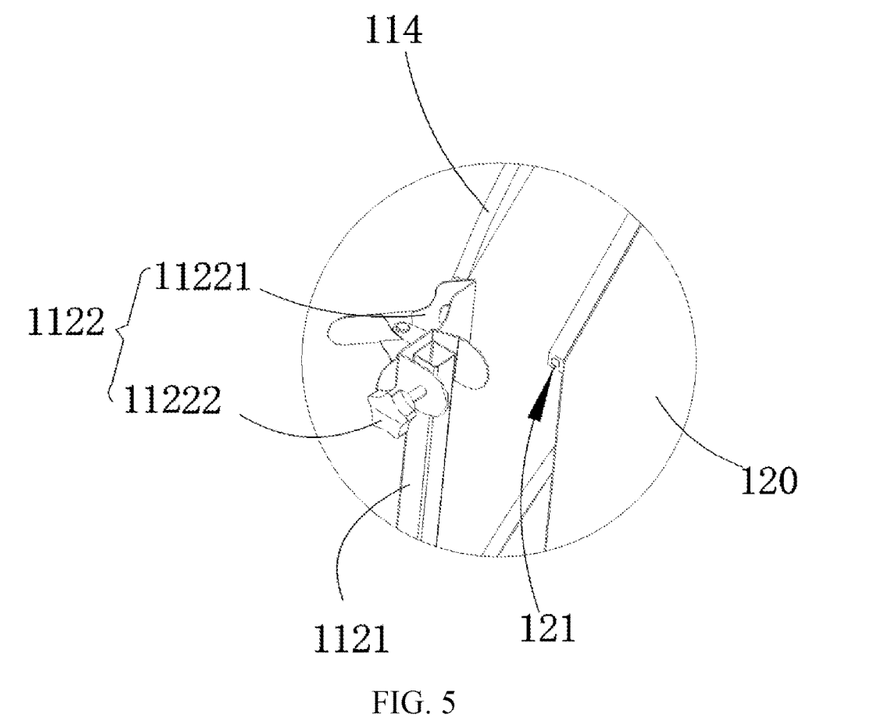
FIG. 5 is an enlarged schematic diagram of portion A shown in FIG. 4.
Figure 6:
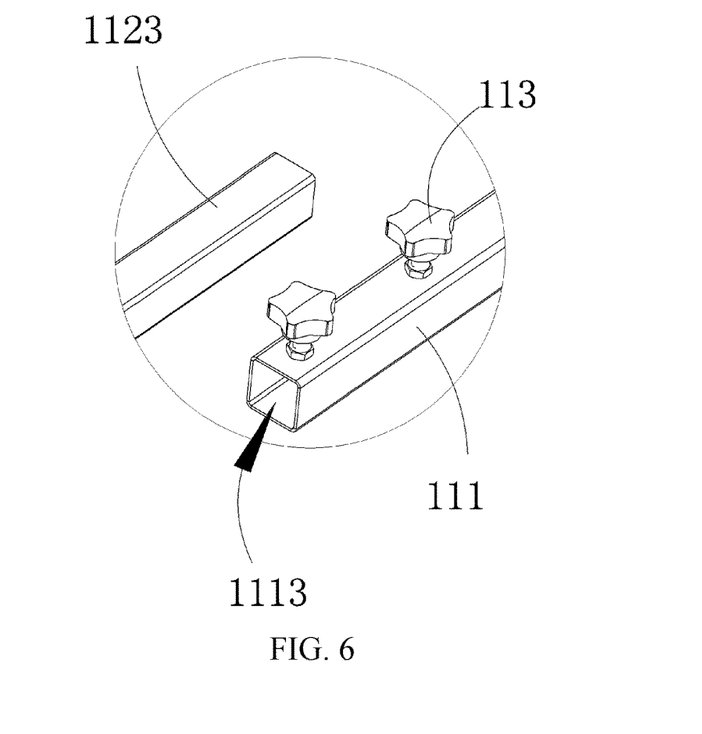
FIG. 6 is an enlarged schematic diagram of portion B shown in FIG. 4.
Figure 7:
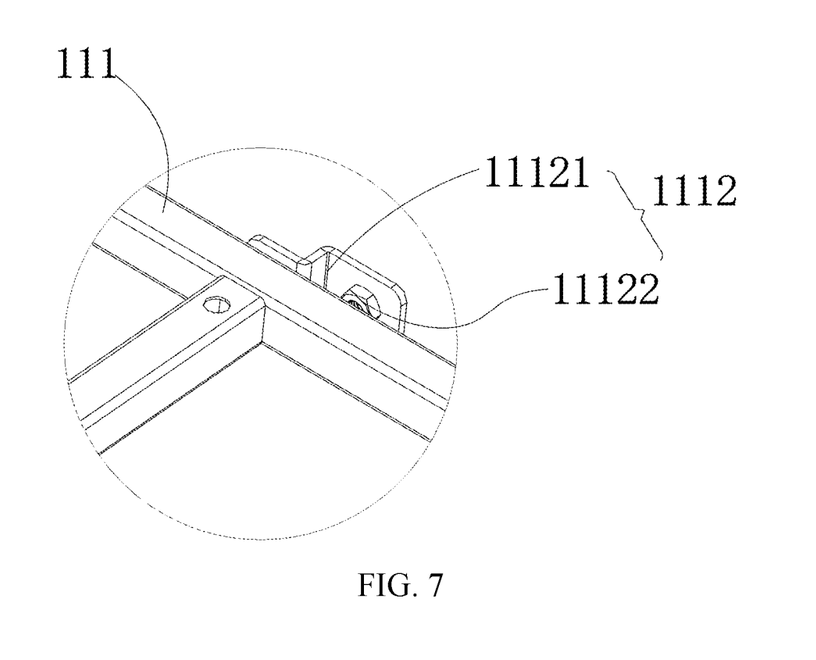
FIG. 7 is an enlarged schematic diagram of portion C shown in FIG. 4.
Figure 9:
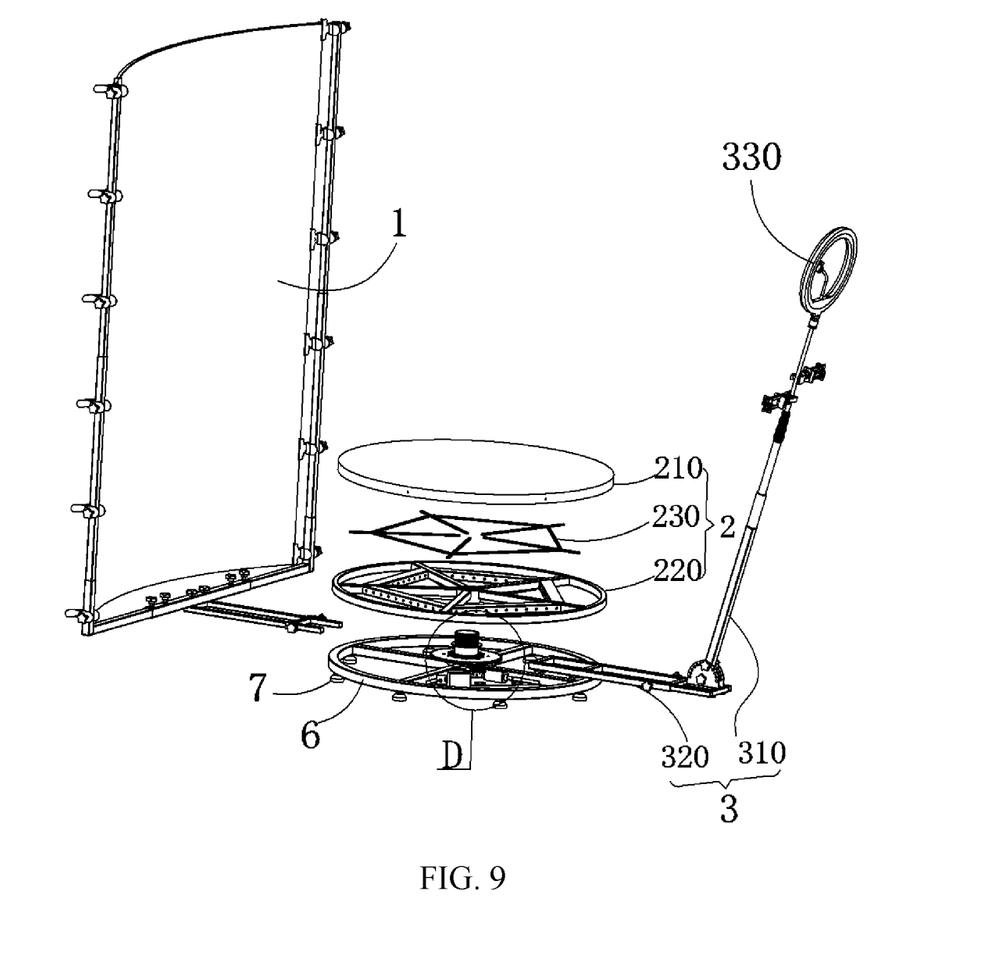
FIG. 9 is an exploded structural schematic diagram of the photo booth of the present disclosure.

As shown in FIGS. 4, 7, and 9, the photo booth further comprises third fasteners 112. The connecting end of the supporting frame 110 is detachably connected to the shooting support 3. The shooting support comprises a connecting cavity (not shown in the drawings) configured to accommodate the connecting end 1111 of the supporting frame 110. The connecting end of the supporting frame extends into the connecting cavity. The third fasteners 1112 are configured to fasten the supporting frame 110 to the shooting support 3.

The supporting frame 110 is detachably connected to the shooting support 3, so when the user does not need to use the special effect curtain assembly 1, the supporting frame 110 is disassembled and disconnected from the shooting support 3, and the photo booth is configured as a common photo booth.

In some embodiments, each of the third fasteners 1112 comprises a connecting plate 11121, a connecting nut 11122, and a fixing screw. A first end of each connecting plate 11121 is welded to an outer wall of the supporting frame 110 or the first end of each connecting plate 11121 is connected to the outer wall of the supporting frame 110 by a first screw rod (not shown). Each connecting nut 11122 is welded to a second end of a corresponding connecting plate 11121. When the supporting frame 110 extends into the connecting cavity to a predetermined depth, each fixing screw passes through a corresponding connecting plate 11121 and is connected to a corresponding connecting nut 11122, and then each fixing screw is tightened to make each fixing screw to be abutted against the shooting support 3. Therefore, the supporting frame 110 is connected to the shooting support 3. Each fixing screw is a thumb screw. Through such design, a connection between the supporting frame 110 and the shooting support 3 is reliable and stable. A depth of the supporting frame 110 extending into the connecting cavity is adjustable, so a distance between the special effect curtain 120 and the shooting device mounted on the shooting support 3 is adjustable.

Figure 8:
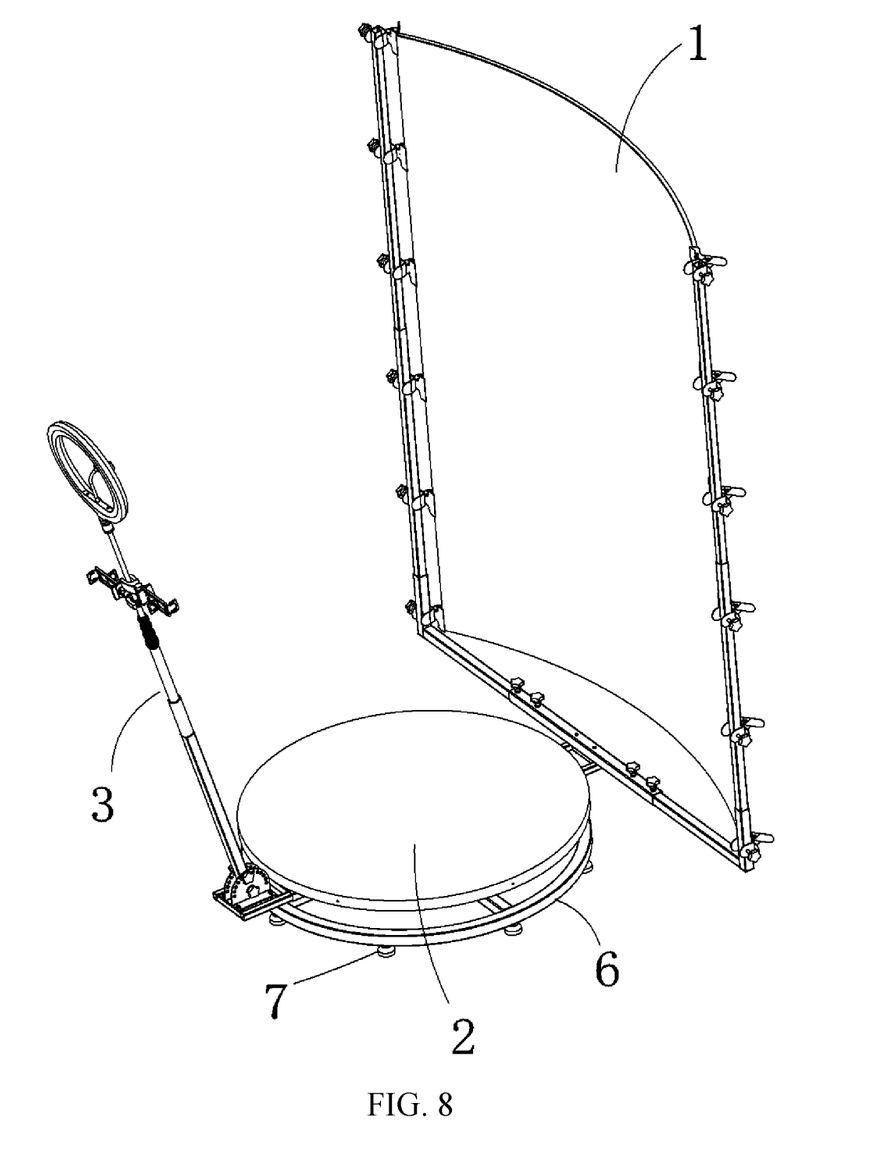
FIG. 8 is a structural schematic diagram of a photo booth of the present disclosure.
Figure 10:
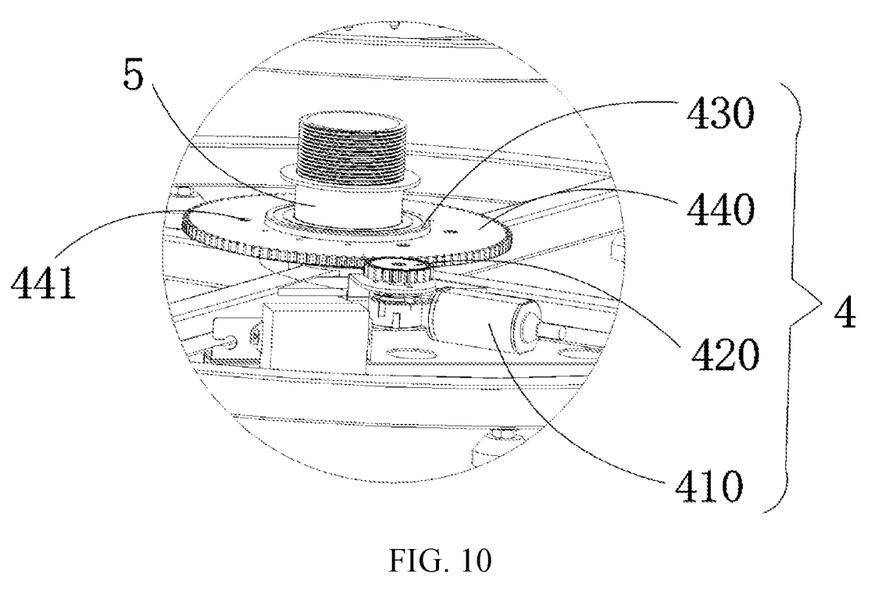
FIG. 10 is an enlarged schematic diagram of portion D shown in FIG. 9.
Figure 11:
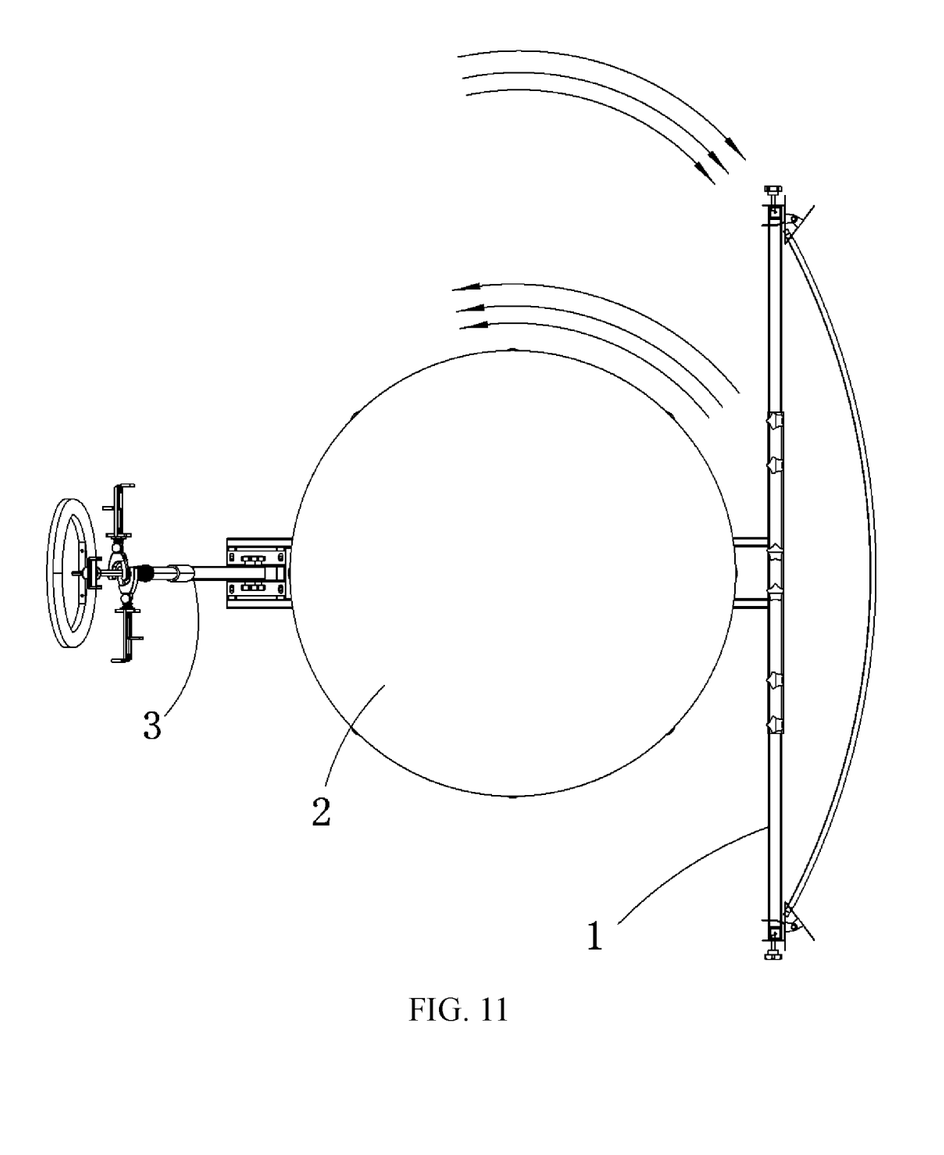
FIG. 11 is a top plan schematic diagram of the photo booth of the present disclosure.

As shown in FIGS. 8-10, the photo booth further comprises a supporting base 6. The supporting piece 5 is a shaft body. A first end of the supporting piece 5 is screwed with the supporting stage 2. A second end of the supporting piece 5 defines a connecting groove (not shown). The connecting groove is welded to the supporting base. A locking screw (not shown in the drawings) passes through the supporting piece 5 and the supporting stage 2 to connect the supporting piece 5 to the supporting stage 2. The driving assembly 4 comprises a driving motor 410 mounted on the supporting base 6, a driving wheel 420 mounted on a power output end of the driving motor 410, a bearing 430 sleeved on an outer wall of the supporting piece 5, and a driven wheel 440 sleeved on an outer wall of the bearing 430. The shooting support 3 and/or the supporting frame 110 is connected to an end surface of the driven wheel 440.

Embodiment 1

When the shooting support 3 and the supporting frame 110 are connected through the third fasteners 1112 and the connecting cavity, the shooting support 3 is connected to the end face of the driven wheel 440, the driven wheel 440 is sleeved on the outer wall of the bearing 430, and the bearing 430 is sleeved on the outer wall of the supporting piece 5, so the shooting support 3 is rotatably connected to the supporting piece 5, and the supporting frame 110 is indirectly rotatably connected to the supporting piece 5 through the shooting support 3.

Embodiment 2 (not Shown in the Drawings)

When the supporting frame 110 is not connected to the shooting support 3, the supporting frame 110 and the shooting support 3 are respectively connected to the end face of the driven wheel 440. The driven wheel 440 is sleeved on the outer wall of the bearing 430, and the bearing 430 is sleeved on the outer wall of the supporting piece 5, so the shooting support 3 is rotatably connected to the supporting piece 5, and the supporting frame 110 is rotatably connected to the support piece 5.

In some embodiments, the bearing 430 and the driven wheel 440 are connected by dislocation welding, which ensures that a welding point is not located on a thinnest portion of the outer wall of the bearing 430, and prevents a poor rotation of the bearing 430 caused by welding.

In some embodiments, the driven wheel 440 and the driving wheel 420 are gears. A screw hole 441 is defined on the end surface of the driven wheel 440. The shooting support 3 passes through the screw hole 441 and is connected to the driven wheel 440 by a second screw. The driving wheel 420 is driven by the driving motor 410, and thus driving the driven wheel 440 to rotate. The driven wheel 440 drives the shooting support 3 and the special effect curtain assembly 1 to rotate around the supporting stage 2 in the circumferential direction.

The supporting stage 2 comprises a supporting cover plate 210 and a reinforcing frame 220. The supporting cover plate 210 is detachably covered on the reinforcing frame 220. A shock-absorbing buffering piece 230 is arranged between the supporting cover plate 210 and the reinforcing frame 220. Height-adjustable foot cups 7 are arranged below the supporting base 6.

In some embodiments, the shooting support 3 comprises a selfie ring light 330, a first bracket 310, and a second bracket 320. The first bracket 310 and the second bracket 320 are telescopic brackets, and an angle between first bracket 310 and the second bracket 320 is adjustable.

The shock-absorbing buffering piece 230 is a shock-absorbing cotton pad, and the shock-absorbing cotton pad is similar to a contour of an upper end surface of the reinforcing frame 220.

What is claimed is:

1. A special effect screen, comprising: a special effect screen assembly; wherein the special effect screen assembly comprises a supporting frame and a special effect curtain; the supporting frame is configured to support and unfold the special effect curtain, so that a top projection of the special effect curtain is curved;
   wherein the supporting frame comprises an adjusting mechanism configured to adjust an arc of the top projection of the special effect curtain; and
   wherein the supporting frame comprises a connecting base, two adjusting frames, first fasteners, and elastic supporting rods; the two adjusting frames are respectively arranged on two sides of the connecting base and are slidably connected to the connecting base; the first fasteners are configured to connect the adjusting frames to the connecting base; the elastic supporting rods pass through the special effect curtain; and two ends of each of the elastic supporting rods are respectively connected to the two adjusting frames.

2. The special effect screen according to claim 1, wherein the adjusting frames comprise telescopic rods and second fasteners; the telescopic rods are extendable and retractable in a vertical direction; the elastic supporting rods are connected to the telescopic rods through the second fasteners.

3. The special effect screen according to claim 2, wherein each of the second fasteners comprises a hinge portion and a locking portion; an end portion of each of the elastic supporting rods is connected to a corresponding hinge portion of a corresponding second fastener; the end portion of each of the elastic supporting rods is rotatably connected to a corresponding adjusting frame of the adjusting frames by the corresponding hinge portion; each locking portion is configured to fasten a corresponding second fastener to a corresponding telescopic rod.

4. The special effect screen according to claim 1, wherein the special effect curtain is a solid color curtain.

5. The special effect screen according to claim 1, wherein the special effect curtain is a green curtain or a blue curtain.

6. A photo booth, comprising:
a special effect screen, wherein the special effect screen assembly comprises a supporting frame and a special effect curtain; the supporting frame is configured to support and unfold the special effect curtain, so that a top projection of the special effect curtain is curved;
a supporting stage,
a shooting support,
a driving assembly, and
a supporting piece;
the shooting support is rotatably connected to the supporting piece; the supporting frame comprises a connecting end; the supporting frame is connected to the shooting support or rotatably connected to the supporting piece through the connecting end; the driving assembly is configured to drive the shooting support and the special effect curtain assembly to rotate around the supporting stage in a circumferential direction;
wherein the photo booth further comprises a supporting base; the supporting piece is a shaft body; a first end of the supporting piece is screwed with the supporting stage; a second end of the supporting piece defines a connecting groove;
the connecting groove is welded to the supporting base; a locking screw passes through the supporting piece and the supporting stage to connect the supporting piece to the supporting stage; the driving assembly comprises a driving motor mounted on the supporting base, a driving wheel mounted on a power output end of the driving motor, a bearing sleeved on an outer wall of the supporting piece, and a driven wheel sleeved on an outer wall of the bearing; the shooting support and/or the supporting frame is connected to an end surface of the driven wheel.

7. The photo booth according to claim 6, wherein the photo booth further comprises third fasteners; the connecting end of the supporting frame is detachably connected to the shooting support; the shooting support comprises a connecting cavity configured to accommodate the connecting end of the supporting frame; the connecting end of the supporting frame extends into the connecting cavity;
the third fasteners are configured to fasten the supporting frame to the shooting support.

8. The photo booth according to claim 6, wherein the shooting support comprises a first bracket and a second bracket; the first bracket and the second bracket are movably connected to each other; the first bracket is configured to connect and mount a shooting device; the second bracket of the shooting support is movably connected to the supporting piece; the special effect curtain is arranged opposite to the first bracket;
wherein the supporting stage comprises a supporting cover plate and a reinforcing frame; the supporting cover plate is detachably covered on the reinforcing frame; a shock-absorbing buffering piece is arranged between the supporting cover plate and the reinforcing frame.

9. The photo booth according to claim 6, wherein the supporting frame comprises an adjusting mechanism configured to adjust an arc of the top projection of the special effect curtain.

10. The photo booth according to claim 9, wherein the supporting frame comprises a connecting base, two adjusting frames, first fasteners, and elastic supporting rods; the two adjusting frames are respectively arranged on two sides of the connecting base and are slidably connected to the connecting base; the first fasteners are configured to connect the adjusting frames to the connecting base;
the elastic supporting rods pass through the special effect curtain; two ends of each of the elastic supporting rods are respectively connected to the two adjusting frames.

11. The photo booth according to claim 10, wherein the adjusting frames comprise telescopic rods and second fasteners; the telescopic rods are extendable and retractable in a vertical direction; the elastic supporting rods are connected to the telescopic rods through the second fasteners.

12. The photo booth according to claim 11, wherein each of the second fasteners comprises a hinge portion and a locking portion; an end portion of each of the elastic supporting rods is connected to a corresponding hinge portion of a corresponding second fastener; the end portion of each of the elastic supporting rods is rotatably connected to a corresponding adjusting frame of the adjusting frames by the corresponding hinge portion; each locking portion is configured to fasten a corresponding second fastener to a corresponding telescopic rod.

13. The photo booth according to claim 6, wherein the special effect curtain is a solid color curtain.

14. The photo booth according to claim 6, wherein the special effect curtain is a green curtain or a blue curtain.

15. A photo booth, comprising:
a special effect screen, wherein the special effect screen assembly comprises a supporting frame and a special effect curtain; the supporting frame is configured to support and unfold the special effect curtain, so that a top projection of the special effect curtain is curved;
a shooting support, wherein the shooting support comprises a first bracket and a second bracket; the first bracket and the second bracket are movably connected to each other; the first bracket is configured to connect and mount a shooting device; the second bracket of the shooting support is movably connected to the supporting piece;
the special effect curtain is arranged opposite to the first bracket;
a driving assembly, wherein the driving assembly comprises a driving motor mounted on the supporting base, a driving wheel mounted on a power output end of the driving motor, a bearing sleeved on an outer wall of the supporting piece, and a driven wheel sleeved on an outer wall of the bearing; the shooting support and/or the supporting frame is connected to an end surface of the driven wheel.

16. The photo booth according to claim 15, wherein the photo booth further comprises a supporting stage and a supporting piece, wherein the shooting support is rotatably connected to the supporting piece; the supporting frame comprises a connecting end; the supporting frame is connected to the shooting support or rotatably connected to the supporting piece through the connecting end;
the driving assembly is configured to dive the shooting support and the special effect curtain assembly to rotate around the supporting stage in a circumferential direction.

17. The photo booth according to claim 16, wherein the photo booth further comprises a supporting base; the supporting piece is a shaft body;
a first end of the supporting piece is screwed with the supporting stage; a second end of the supporting piece defines a connecting groove; the connecting groove is welded to the supporting base; and a locking screw passes through the supporting piece and the supporting stage to connect the supporting piece to the supporting stage.

18. The photo booth according to claim 16, wherein the supporting stage comprises a supporting cover plate and a reinforcing frame; the supporting cover plate is detachably covered on the reinforcing frame; a shock-absorbing buffering piece is arranged between the supporting cover plate and the reinforcing frame.

* * * * *